United States Patent
Mulhouse et al.

(10) Patent No.: US 7,476,988 B2
(45) Date of Patent: Jan. 13, 2009

(54) POWER STEALING CONTROL DEVICES

(75) Inventors: David P. Mulhouse, Minnetonka, MN (US); Curtis B. McNamara, Minneapolis, MN (US); Robert D. Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 407 days.

(21) Appl. No.: 11/164,464

(22) Filed: Nov. 23, 2005

(65) Prior Publication Data

US 2007/0114848 A1 May 24, 2007

(51) Int. Cl.
 *H02J 7/00* (2006.01)
(52) U.S. Cl. .......................................... 307/66
(58) Field of Classification Search .................. 307/66
 See application file for complete search history.

(56) References Cited

U.S. PATENT DOCUMENTS

| | | | |
|---|---|---|---|
| 4,078,720 A | 3/1978 | Nurnberg | |
| 4,093,943 A * | 6/1978 | Knight | 340/693.1 |
| 4,504,778 A | 3/1985 | Evans | |
| 4,745,300 A | 5/1988 | Kammerer et al. | |
| 4,806,843 A | 2/1989 | Mertens et al. | |
| 5,025,134 A | 6/1991 | Bensoussan et al. | |
| 5,081,411 A | 1/1992 | Walker | |
| 5,192,874 A | 3/1993 | Adams | |
| 5,277,244 A | 1/1994 | Mehta | |
| 5,579,197 A * | 11/1996 | Mengelt et al. | 361/93.4 |
| 5,903,139 A | 5/1999 | Kompelien | |
| 6,490,174 B1 * | 12/2002 | Kompelien | 363/16 |
| 6,566,768 B2 | 5/2003 | Zimmerman et al. | |

FOREIGN PATENT DOCUMENTS

| | | |
|---|---|---|
| CA | 1035448 | 7/1978 |
| FR | 2491692 | 4/1982 |

\* cited by examiner

*Primary Examiner*—Robert L. Deberadinis

(57) ABSTRACT

A power stealing system having a switch and a circuit that takes power from equipment to operate control electronics. The system may be such that power stealing occurs while the equipment is not powered to avoid disruption or false signals in the electronics or equipment. The circuit may convey taken power to a storage device. The electronics may be powered by the storage device. The storage device may have a capacitor, a rechargeable battery, a non-chargeable battery, a solar cell, fuel cell, line power, and/or the like.

32 Claims, 5 Drawing Sheets

POWER STEALING CONTROL DEVICES

BACKGROUND

The invention pertains to control devices using power stealing and particularly pertains to thermostatic devices having power stealing circuitry.

SUMMARY

The invention is a control device doing power stealing in its operation.

DESCRIPTION

Figure 1:
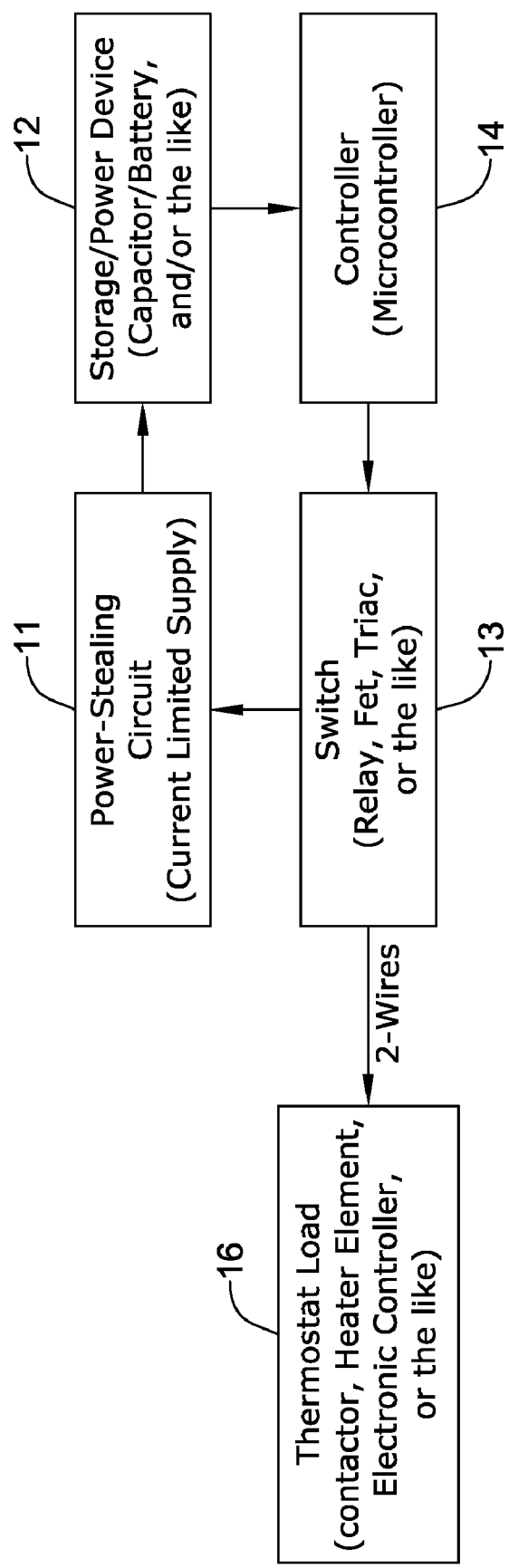
FIG. 1 is a block diagram of a power stealing control device.
Figure 2:
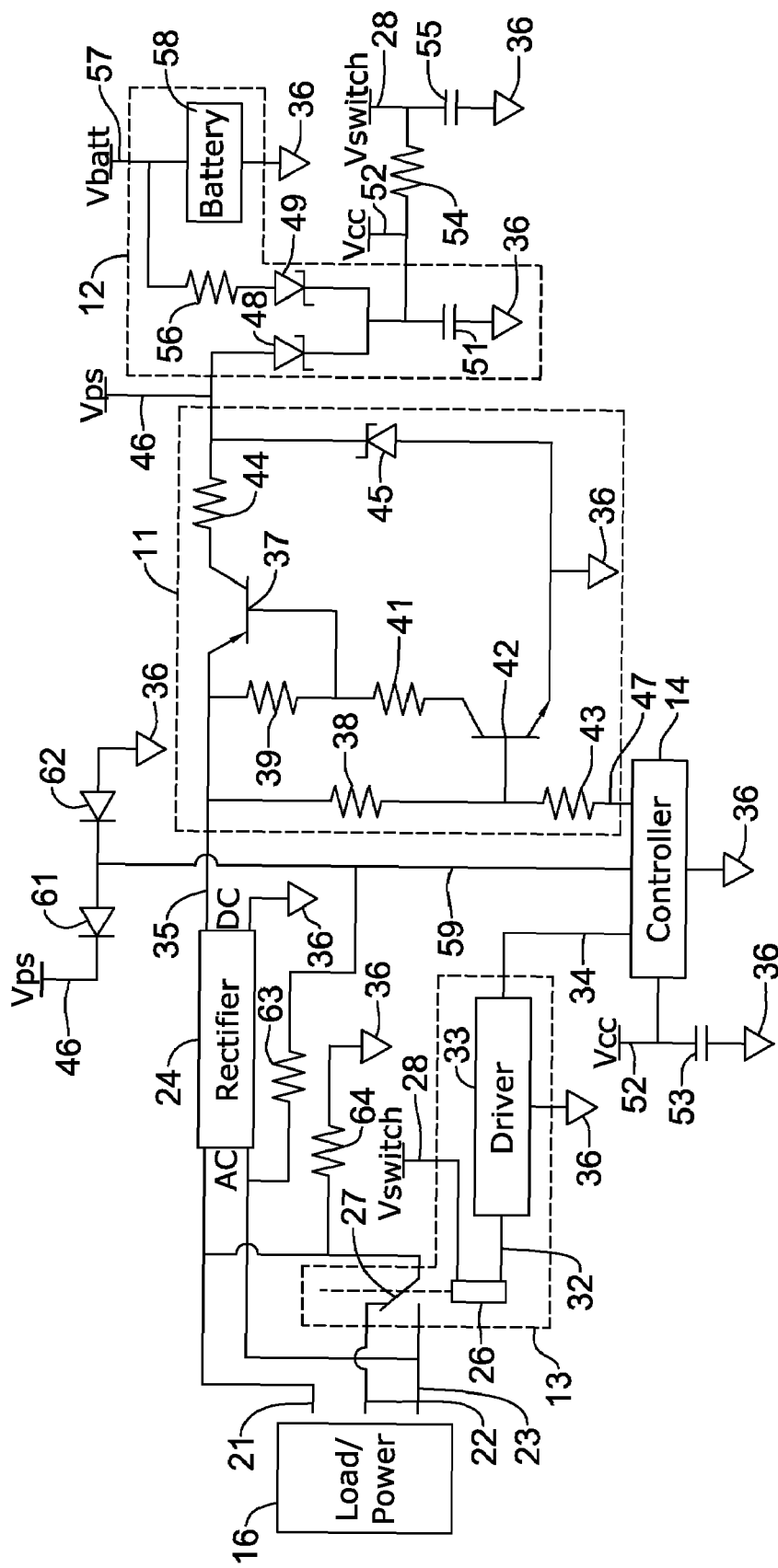
FIGS. 2, 3, 4 and 5 are circuit diagrams of a power stealing control device.

A control device having a power stealing mechanism is shown in FIG. 1. Power may be picked off of a supply for a thermostatic load 16. Control of power may involve a switch 13 which may consist of a relay, FET, TRIAC, or the like. The switch 13 may be controlled by a controller 14 which may be a microcontroller. The switch 13 may permit a power-stealing circuit 11 to take power for the control device, such as thermostatic electronics, from power for the thermostatic load 16. Then power from circuit 11 may be conveyed to a storage/power device 12. Device 12 may have a capacitor, rechargeable battery, non-chargeable battery, solar cell, fuel cell, and/or the like. Some of the stored power may be provided to the controller 14 to sustain operation of it, and to switch 1 3 and circuit 11. Line power may be available.

A circuit diagram of the power stealing electronics for a control device is shown in FIGS. 2, 3, 4 and 5. The circuit diagrams in these Figures reveal illustrative examples of implementing the present invention. With a switch 13 in a first position, line 21 is not connected to a line or terminal 23. With switch 13 in a second position, then line 23 is connected to line 21.

Switch 13 may be instead some solid state device such as a FET, TRIAC, or the like. Switch 13 in FIGS. 2, 3, 4 and 5 may be, for example, a relay, a latching relay, or solid state device. The switch or relay 13 in FIG. 2 may have solenoid 26 that is connected by a driver 33 to ground, since the end of the solenoid is connected to $V_{SWITCH}$, and pull a contact arm 27 down to short terminals 21 and 23 to call or connect the load 16 to its power. Upon release or the grounding of the terminal of solenoid 26 to ground, the contact arm 27 may return to a normal position having a contact with line 22. Then there may be an AC voltage across terminals 21 and 23 which are connected to rectifier 24 for rectification of the input to a DC output at terminals 35 and 36. The voltage at terminals 21 and 23 may instead be DC and the rectifier 24 might not be needed.

Figure 3:
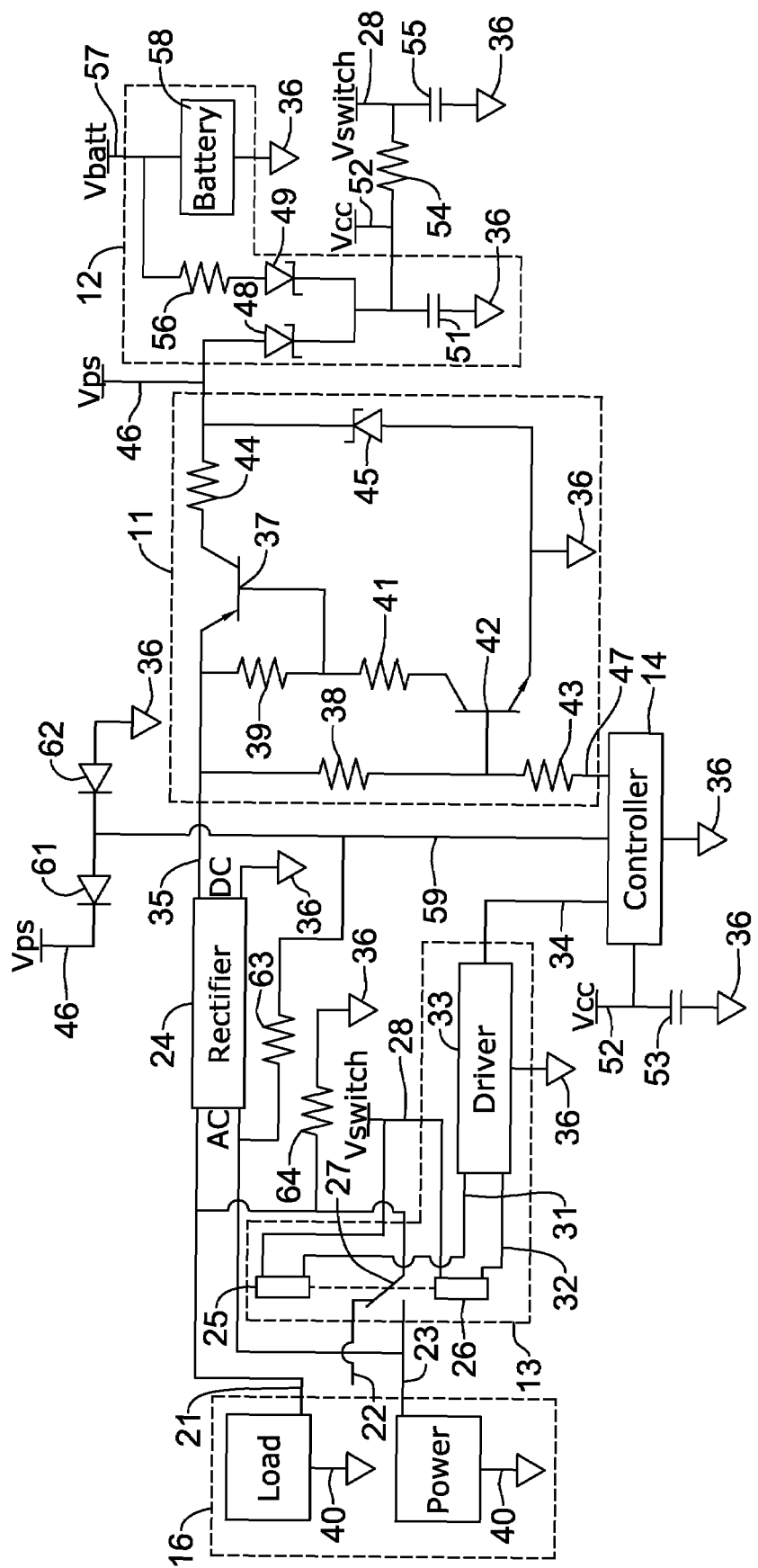

The device in FIG. 3 may have two solenoids 25 and 26 which can move a contact arm 27 from terminal 22 to terminal 23 or vice versa. Each solenoid may have a lead connected to a switch voltage $V_{SWITCH}$ 28. Solenoids 25 and 26 also may have leads 31 and 32 connected to a driver 33 which may activate solenoid 25 or solenoid 26 by connecting lead 31 or 32 to a device ground 36, respectively. Only one lead 31 or 32 should be grounded at one time. However, when arm 27 is moved to terminal 22 or to 23, with an activation of solenoid 25 or 26, respectively; the lead, 31 or 32, need not be constantly grounded to maintain arm 21 in its last moved-to position. Also, if the switch voltage 28 is non-existent, then arm 27 may remain in its last position with neither solenoid activated. The grounding of lines 31 and 32 need be only temporary to change the position of relay arm 27. Thus, no energy is needed to maintain either position of arm 27. Because of this characteristic, the switch may be regarded as a latching relay. Driver 33 may change the position of the relay with a signal (or multiple signals) on line 34 from controller 14. Controller 14 may be, for example, an eight bit microcontroller which has a part number ATmega48V-10, possibly available from a vendor such as Atmel Corporation.

When a voltage from a load 16 and its power supply with a load ground 40 (noted in FIGS. 3, 4 and 5) is across the input lines 21 and 23 of rectifier 24, then there may be a DC voltage at the output of rectifier 24 on line 35 relative to a device ground 36. The rectifier output voltage on line 35 may go to the power stealing circuit 11. Line 35 may be connected to an emitter of PNP transistor 37. Transistor 37 may be, for example, a part number MMBT2907A, possibly available from a vendor such as Diodes Inc. Resistors 38 and 39 may have one end connected to line 35. Resistors 38 and 39 may be about 10 megohms and 20 K ohms, respectively. The other end of resistor 39 may be connected to the base of transistor 37 and one end of a resistor 41. Resistor 41 may be about 100 K ohms. The other end of resistor 41 may be connected to a collector of an NPN transistor 42. Transistor 42 may be, for example, a part number MMBTA05LT1, such as an "ON Semiconductor™" device. The other end of resistor 38 may be connected to the base of transistor 42 and to one end of a resistor 43 of about 20 K ohms. The other end of resistor 43 may be a power-steal control line 47 that is connected to controller 14. The collector of transistor 37 may be connected to one end of a resistor 44 of about 20 K ohms. The other end of resistor 44 may provide a power-steal output voltage ($V_{PS}$) line 46 of circuit 11. The emitter of transistor 42 and an anode of a zener diode 45 may be connected to device ground 36. The cathode end of diode 45 may be connected to line 46. Diode 45 may be a 5.1 volt zener diode having, for example, a part number MMSZ4689, possibly available from Fairchild Semiconductor Corporation. Resistor 44 may be a current limiting resistor.

The output line $V_{PS}$ 46 of circuit 11 may go to a storage/power device 12. Line 46 may be connected to an anode of a diode 48. The cathode of diode 48 may be connected to the cathode of diode 49. Diodes 48 and 49 may be a pair of Schottky diodes having a part number BAS70-05, which possibly is available from General Semiconductor, Inc., in Melville, N.Y. A capacitor 51 may at the same time be a storage device for power stealing by circuit 11 provided at $V_{PS}$ terminal or line 46. Capacitor 51 could be replaced by a rechargeable battery. The cathodes of diodes 48 and 49 may be connected to one end of the storage capacitor 51 which may be about 47 millifarads. This end of capacitor 51 may be regarded as a voltage terminal ($V_{CC}$) 52. $V_{CC}$ 52 may be connected to the controller 14. Connected between $V_{CC}$ 52 and device ground 36 may be at least one 0.1 microfarad capacitor 53. The other end of storage capacitor 51 may be connected to device ground 36.

A resistor 54 of about 274 ohms may have one end connected to $V_{CC}$ terminal 52 and the other end connected to the $V_{SWITCH}$ terminal 28. A capacitor 55 of about 1000 microfarads may be connected between $V_{SWITCH}$ terminal 28 and device ground 36.

A resistor 56 of about 274 ohms may have one end connected to the anode of diode 49 and another end connected to a battery voltage ($V_{BATT}$) terminal 57. Terminal 57 may be connected to a positive terminal of a battery 58. The negative terminal of battery 58 may be connected to the device ground 36. Battery 58 may be an externally or internally chargeable storage battery, a non-chargeable battery, or a back-up voltage source at terminal 57. The battery 58 may provide power to controller 14 and other components of the system electronics as may be needed. This battery 58 may be a primary source or secondary backup source, and in that place it may be a non-chargeable or chargeable battery, fuel cell, solar cell, or the like.

The $V_{PS}$ terminal 46 may be connected to the cathode of a diode 61. The anode of diode 61 may be connected to the cathode of a diode 62. The anode of diode 62 may be connected to device ground 36. Diodes 61 and 62 may have, for example, a part number BAV199 and be possibly available from a vendor such as Diodes Incorporated. The common connection between diodes 61 and 62 may be connected via a line 59 to the controller 14. Line 59 may provide to controller 14 a status signal of line 23 to rectifier 24 via a resistor 63 of about 1.2 megohms. There may be a pull-down resistor 64 of about 1.2 megohms connected between line 21 of rectifier 24 and the device ground 36.

Figure 4:
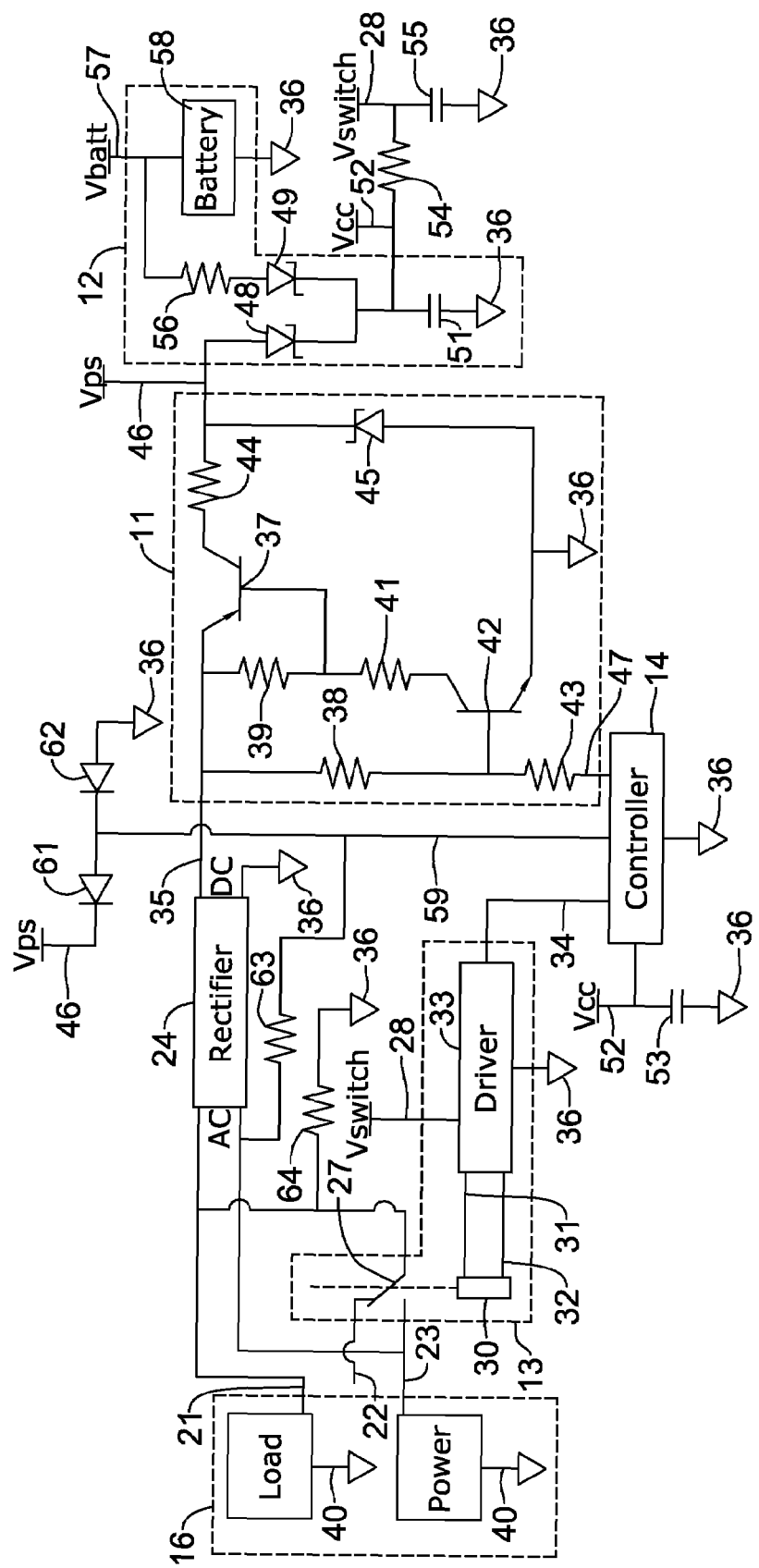
Figure 5:
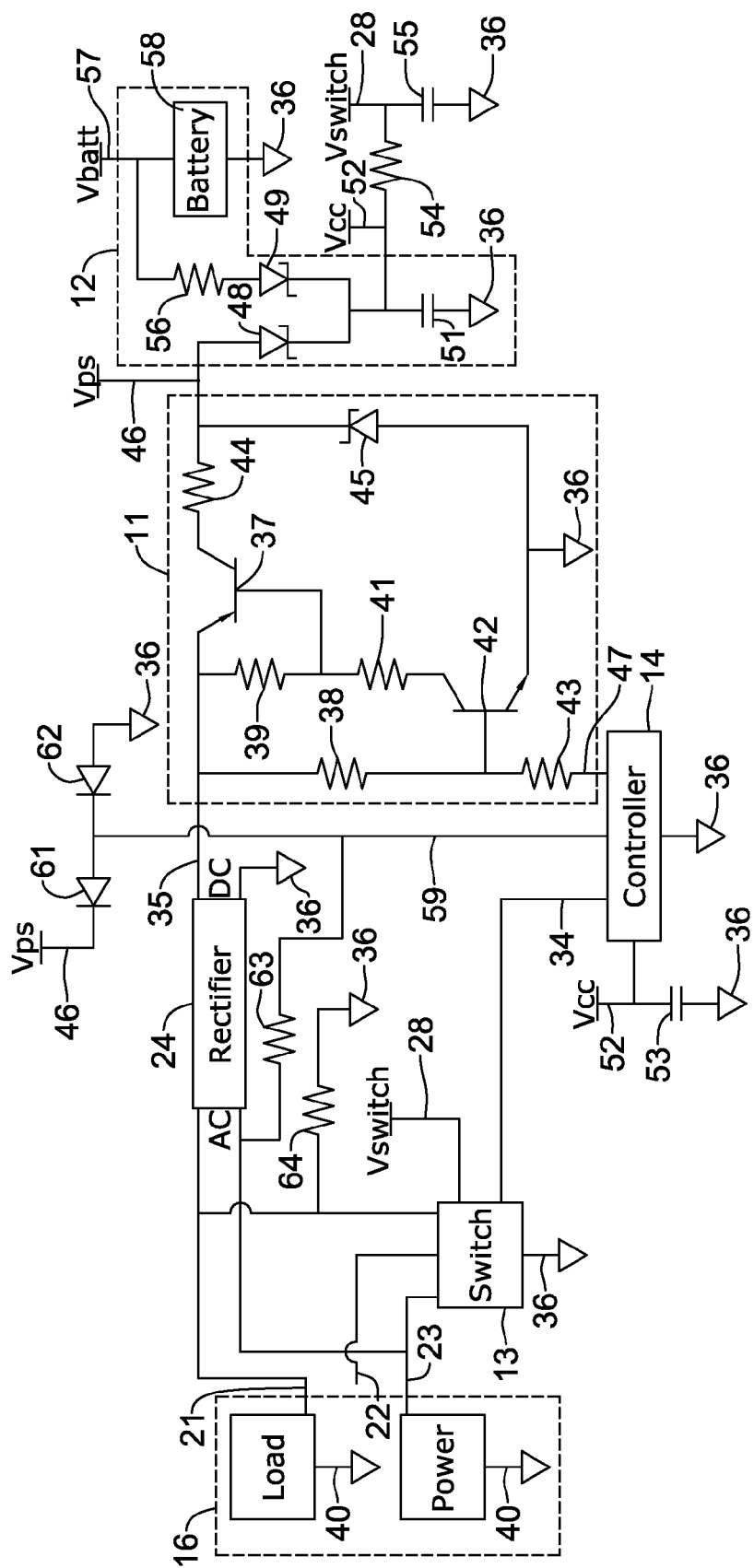

FIG. 4 is similar to FIG. 3 except it may have a single coil 30 latching switch 13 that uses different polarities in application of electrical power to the coil or actuator 30 to move and latch the switch contact 27 one way or the other, respectively. FIG. 5 is similar to FIGS. 2, 3 and 4 except that FIG. 5 may incorporate a solid state switch as device 13. The switch may of a latching topology or a non-latching topology. The switch may instead be another kind of device that accomplishes the appropriate circuit connections for the invention.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A power stealing system comprising:
    a switch for switching power on and off to an electrical load;
    a control circuit connected to the switch;
    a storage device connected to the control circuit, wherein the control circuit conveys power from the switch to the storage device when the switch is off;
    a controller connected to the switch and control circuit, wherein the controller is configured to control the switching of the switch;
    a secondary power supply; and
    wherein the control circuit is configured to convey power from the storage device to the controller, and if the storage device does not have sufficient power to power the controller, the control circuit conveys power from the secondary power supply to the controller.

2. The system of claim 1, wherein the switch is connectable between a set of terminals and may result in the load being powered if the terminals are electrically connected to each other.

3. The system of claim 2, wherein a voltage potential may exist across the terminals when not connected to each other.

4. The system of claim 3, wherein the control circuit may convey power from the terminals to the storage device.

5. The system of claim 4, wherein the storage device is a capacitor.

6. The system of claim 4, wherein the storage device is a rechargeable battery.

7. The system of claim 4, wherein the switch is a relay.

8. The system of claim 7, wherein the switch is a latching relay.

9. The system of claim 4, wherein the switch is a solid state device.

10. The system of claim 4, wherein:
    the secondary power supply is a backup battery; and
    the backup battery is for providing power in lieu of, or in addition, the storage device.

11. The system of claim 4, wherein:
    the secondary power supply is a solar cell; and
    the solar cell is for providing power in lieu of, or in addition to, the storage device.

12. The system of claim 4, wherein:
    the secondary power supply is a fuel cell; and
    the fuel cell is for providing power in lieu of, or in addition to, the storage device.

13. A method for stealing power, comprising:
    switching power on or off to an electrical load with a switch;
    conveying power as needed from the switch, when the switch is off and no power is provided to the electrical load, to a storage device; and
    powering control electronics that control the switching of the switch, at least in part, with the power stored in the storage device.

14. The method of claim 13, wherein the switch has a topology such that upon switching the power off to the electrical load, the terminals of the switch are connected to the storage device.

15. The method of claim 14, wherein the storage device is a capacitor.

16. The method of claim 14, wherein the storage device is a rechargeable battery.

17. The method of claim 14, further comprising providing a backup power source to provide power in lieu of, or in addition to, the storage device.

18. The method of claim 17, wherein the backup power source is a battery.

19. The system of claim 17, wherein the backup power source is a solar cell.

20. The system of claim 17, wherein the backup power source is a fuel cell.

21. The method of claim 13 wherein the control electronics include a microcontroller to control the switching of power to the electrical load.

22. A system for taking power, comprising:
    a switch for connection between a power source and a load;
    a conveyance circuit connected to the switch;
    a storage mechanism connected to the conveyance circuit;
    a controller connected to the switch; and
    wherein the controller is powered by the storage mechanism at least some of the time.

23. The system of claim 22, wherein:
    the switch is a relay having a first position for connecting the power source and the load, and having a second position disconnecting the power source and the load; and
    the conveyance circuit may convey power from the switch in the second position to the storage mechanism.

24. The system of claim 23, wherein a default position of the switch is the second position.

25. The system of claim 24, wherein if the controller receives insufficient power from the storage mechanism, then the switch will be in the default position.

26. The system of claim 25, further comprising:
a backup battery; and
wherein the backup battery is connected to the controller when the switch is in the default position.

27. The system of claim 25, further comprising:
a backup power source; and
wherein the backup power source is a solar cell.

28. The system of claim 25, further comprising:
a backup power source; and
wherein the backup power source is a fuel cell.

29. The system of claim 22, wherein the storage mechanism is a capacitor.

30. The system of claim 22, wherein the storage mechanism is a chargeable battery.

31. The system of claim 22, wherein the switch is a relay.

32. The system of claim 22, wherein the switch is a solid state device.

* * * * *